July 4, 1933.  M. LARSSON  1,916,429
METHOD OF PRODUCING MIXED FERTILIZERS
Filed July 11, 1930
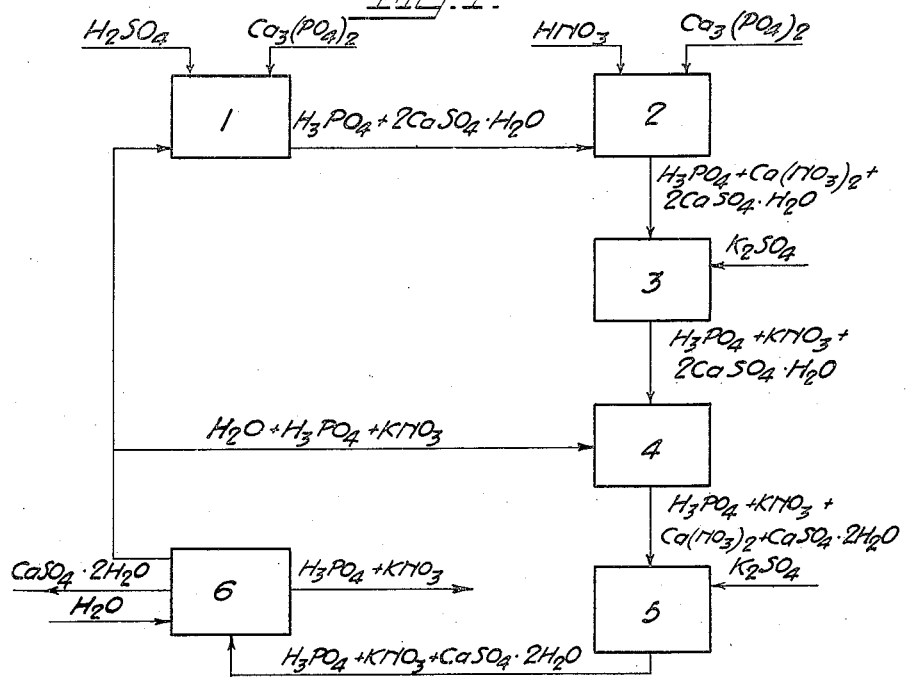
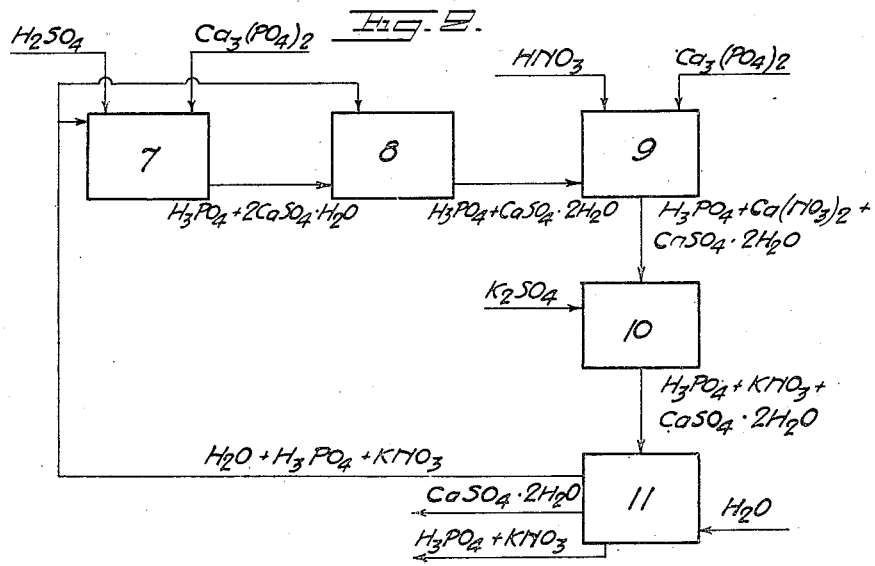
Inventor
Markus Larsson
By Geo. P. Hyde
Attorney Patented July 4, 1933

1,916,429

UNITED STATES PATENT OFFICE

MARKUS LARSSON, OF BERLIN, GERMANY, ASSIGNOR TO KUNSTDÜNGER-PATENT-VERWERTUNGS-AKTIENGESELLSCHAFT, OF GLARUS, SWITZERLAND

METHOD OF PRODUCING MIXED FERTILIZERS

Application filed July 11, 1930, Serial No. 467,232, and in Sweden July 11, 1929.

It has already been proposed to leach phosphate rock with nitric acid and to precipitate the lime dissolved as calcium sulphate by means of potassium sulphate, a solution being thus obtained which contains a mixture of potassium nitrate and phosphoric acid and is used for the production of mixed fertilizers.

In the performance of such leaching process an essential difficulty is caused by the fact that not pure calcium sulphate but an insoluble double salt containing a high percentage of potassium is precipitated. Said double salt is very stable and it is, therefore, not decomposed in washing the precipitate with water. The content of potash in such double salt can be recovered only by the treatment of the precipitate with rather strong acid solutions. It is possible to avoid the formation of said double salt by working with dilute solutions but in such case the process will be less economical due to the large quantities of water which must be evaporated in order to obtain the salts contained in the solution in solid state.

The object of this invention is to avoid said drawbacks and to make it possible to produce rather concentrated salt solutions without formation of any insoluble double salt. The invention consists, chiefly, in this that the percentage of potash in the reaction products is reduced by the addition of a solution containing phosphoric acid or an ammonium salt or both. The ammonium salt may for instance be ammonium phosphate, ammonium sulphate or ammonium nitrate. Such solutions are obtained in a more or less dilute form in other processes and as they in any case must be evaporated they are with advantage utilized as diluting means for the potassiferous solution obtained in the reaction between phosphate rock, nitric acid and potassium sulphate, whereby the addition of diluting water otherwise required is avoided. By such addition the percentage of potash in the solution is reduced and thus the formation of insoluble double salts containing potash is avoided.

The said solution of phosphoric acid or ammonium salt should be added before the calcium sulphate is precipitated in order to avoid the formation of insoluble calcium potassium sulphate.

The phosphoric acid solution may, for instance, be obtained from a leaching plant in which phosphate rock is treated with sulphuric acid in which case phosphoric acid only is produced, or with a mixture of sulphuric acid and ammonium sulphate in which case a mixture of phosphoric acid and ammonium phosphate is obtained, or the phosphoric acid required for the process may be produced by other methods (electrothermically or thermically).

If the phosphoric acid is produced in the wet way, for instance with sulphuric acid, it is not necessary to separate the phosphoric acid solution from the calcium sulphate precipitated but the mixture of phosphoric acid and precipitate is, preferably, supplied directly to the plant in which the phosphate rock is treated with nitric acid and potassium sulphate. In this manner it is possible to wash in the same washing plant the calcium sulphate formed in the production of the phosphoric acid as well as the calcium sulphate produced in the leaching with nitric acid and potassium sulphate.

In Figs. 1 and 2 of the annexed drawing I have shown diagrammatically two embodiments of apparatus for use in carrying out the method according to this invention.

Referring to Fig. 1, 1 is a reaction vessel in which phosphate rock is mixed with sulphuric acid and with washing liquid from the washing plant 6 described herebelow. Said washing liquid contains substantially phosphoric acid and potassium nitrate together with water in a sufficient quantity to give a fluid sludge in the vessel 1. The reaction in the vessel 1 is carried out either at a low temperature in which case a precipitate of calcium sulphate in the form of dihydrate $CaSO_4.2H_2O$ is obtained, which then by the heating of the reaction products is converted into semi-hydrate $CaSO_4.\tfrac{1}{2}H_2O$, or at such a high temperature that the calcium sulphate is precipitated directly as semihydrate. The reaction products are then transferred to a reaction vessel 2 provided with a stirring apparatus, in which also phosphate rock and nitric acid or the reaction products of phosphate rock and nitric acid which beforehand have been brought to react with each other are introduced. From the vessel 2 the reaction products are transferred to a reaction vessel 3 having a stirring device, and to said vessel also potassium sulphate, preferably suspended in water or washing liquid from a preceding operation, is supplied. The temperature in the vessel 3 is, preferably, kept so high that the calcium sulphate formed at the reaction between the calcium nitrate and the potassium sulphate crystallizes as semihydrate. The addition of potassium sulphate in the reaction vessel 3 is made in deficit in relation to the lime content of the solution in order to avoid a too great percentage of potash in the solution. From the vessel 3 the reaction products are, preferably, transferred to a vessel 4, in which they are cooled and diluted with a portion of the washing water used in the process and the semihydrate is left to recrystallize into dihydrate. When the conversion into dihydrate is completed the reaction products are transferred to a reaction vessel 5 and a further quantity of potassium sulphate is added to precipitate the remainder of lime in the solution as calcium sulphate which then precipitates as dihydrate on the dihydrate crystals already present in the solution. The reaction products are then transferred to a separating and washing plant 6 in which the strong solution of phosphoric acid and potassium nitrate formed in the process is separated from the insoluble products and the latter are freed from adhering solution by washing with water. The clear solution is then neutralized, for instance with ammonia, and evaporated. The weak solution of phosphoric acid and potassium nitrate obtained in washing the insoluble products is, as above mentioned, supplied partly to the reaction vessel 1 and partly to the recrystallizing vessel 4.

In Fig. 2 is shown diagrammatically another embodiment of the process. In the reaction vessel 7 sulphuric acid and phosphate rock together with a portion of the washing liquid obtained in the process are supplied, the concentration being kept rather high and the temperature being kept at least at 80° C. so that the calcium sulphate formed crystallizes as semihydrate. The reaction products are then transferred to a vessel 8 in which they are cooled and diluted with a portion of the washing liquid obtained in the process and the semihydrate is left to recrystallize into dihydrate. The reaction products are then transferred to a reaction vessel 9 to which also phosphate rock and nitric acid are supplied. From the vessel 9 all reaction products are transferred to a vessel 10 in which also potassium sulphate, preferably suspended in water or in washing liquid, is supplied, the lime present in the solution being thus precipitated as calcium sulphate. The temperature at this step is kept sufficiently high to prevent the crystallization of the potassium nitrate but sufficiently low to allow the calcium sulphate precipitated to crystallize as dihydrate. As the solution already contains gypsum crystals the calcium sulphate formed at this stage of the process is precipitated chiefly on said crystals, the formation of small and badly shaped crystals being thus avoided. The gypsum is in this manner obtained as crystals which easily deposit in the solution and easily can be separated from the solution by filtering. From the vessel 10 the reaction products are transferred to a separating and washing plant 11 in which the concentrated solution of phosphoric acid and potassium nitrate is separated from the insoluble products and the latter are washed with water for the recovery of adhering solution. The concentrated solution is then neutralized with ammonia and evaporated while the weak solution of phosphoric acid and potassium nitrate obtained in the washing operation is supplied as above mentioned partly to the reaction vessel 7 and partly to the recrystallizing vessel 8.

The method described above has also the advantage that the percentages of potash, phosphoric acid and nitrogen in the end product can be easily varied within wide limits by varying the relation between the phosphoric acid or the ammonium salt and the nitric acid used in the process. It should, however, always be observed that a sufficient quantity of phosphoric acid or ammonium salt solution is added before the addition of the potassium sulphate in order to avoid the formation of double salts of potassium and calcium.

It is also possible to combine the above described method with the method described in our copending application No. 430,111 according to which a part of the finished solution by cooling is freed from a part of its content of potassium nitrate and then is returned in the process as diluting means.

It is important for the producing of gypsum of a suitable crystal shape that ammonium salt is present at the recrystallization of the semihydrate into dihydrate and at the precipitation of calcium sulphate as dihydrate. If an ammonium salt solution has not been used as diluting means a minor quantity of ammonium salt is, preferably, added at the recrystallization. Such supply of ammonium salt may, for instance, be effected by an addition of ammonia to the washing liquid added to promote the recrystallization of the semihydrate into dihydrate.

*Example:*—1.5 kgs of Morocco phosphate is treated in the vessel 7, Fig. 2, with a mixture of 1.46 kgs of sulphuric acid of the specific gravity 1.71, 0.25 kg of ammonium sulphate and such quantity of washing liquid from a preceding operation that the concentration of $P_2O_5$ in the solution is about 30%. The temperature during the reaction is kept so high (above 90° C.) that the calcium sulphate is precipitated as semihydrate. The reaction products are then transferred to the vessel 8 and the remainder of the washing liquid from the preceding operation is added whereby the reaction products are cooled and diluted in such degree that the calcium sulphate recrystallizes from semihydrate into dihydrate.

The reaction products are then mixed in the vessel 9 with a solution of 1.5 kgs of Morocco phosphate in 3.38 kgs of 50% nitric acid whereupon the mixture is transferred to the vessel 10 wherein 2.32 kgs of potassium sulphate is added in portions to precipitate the lime dissolved. The temperature at said precipitating reaction is kept at 50 to 60° C., said temperature being sufficiently low to prevent the precipitation of the calcium sulphate as semihydrate but also high enough to prevent the crystallizing of the potassium nitrate.

The solution is then separated in the separation plant 11 from the calcium sulphate by decantation or filtering, whereupon a part of the potassium nitrate may be brought to crystallize by the cooling of the solution and of the remaining solution a part is neutralized with ammonia and evaporated while the remainder is returned in the process as diluting means, or the solution may directly be neutralized with ammonia and evaporated, whereby a mixed fertilizer containing nitrogen, phosphoric acid and potash is obtained.

What I claim is:

1. Method of producing mixed fertilizers, which comprises dissolving phosphate rock separately in nitric acid and in sulphuric acid, combining the reaction products, and adding potassium sulphate to precipitate the lime dissolved.

2. Method of producing mixed fertilizers, which comprises dissolving phosphate rock separately in nitric acid and in sulphuric acid, combining the reaction products, adding to the mixture a solution obtained in a preceding operation and containing phosphoric acid and potassium nitrate, adding potassium sulphate to precipitate the lime present in the solution, and removing the insoluble products.

3. Method of treating phosphate rock, which comprises dissolving a portion of the phosphate rock in sulphuric acid under such conditions of heat and concentration that the calcium sulphate formed crystallize with at most one half molecule of crystal water, dissolving another portion of the phosphate rock in nitric acid, combining the reaction products of said dissolving operations, recrystallizing the calcium sulphate into dihydrate and then adding potassium sulphate to precipitate the lime dissolved.

In testimony whereof I have signed my name.

MARKUS LARSSON.